United States Patent [19]

Chun

[11] Patent Number: 4,657,514
[45] Date of Patent: Apr. 14, 1987

[54] AMPHIBIOUS PEDAL POWERED SAILBOAT

[76] Inventor: Andrew Chun, 2022 N. 153rd Pl., Seattle, Wash. 98133

[21] Appl. No.: 758,266

[22] Filed: Jul. 24, 1985

Related U.S. Application Data

[63] Continuation-in-part of Ser. No. 524,355, Aug. 18, 1983, Pat. No. 4,533,330.

[51] Int. Cl.$^4$ ............................................. B63H 16/00
[52] U.S. Cl. ........................................ 440/31; 440/21; 280/213
[58] Field of Search .................. 440/21, 26, 30, 31, 440/39, 43; 280/213

[56] References Cited

U.S. PATENT DOCUMENTS

| | | | |
|---|---|---|---|
| 2,930,340 | 3/1960 | Sessions | 440/30 |
| 4,077,351 | 3/1978 | Girona | 440/30 |
| 4,318,700 | 3/1982 | Price | 114/58 |
| 4,408,772 | 10/1983 | Hollwarth | 114/144 R |

FOREIGN PATENT DOCUMENTS 733390  12/1973  Rep. of Korea ..................... 440/31

Primary Examiner—Sherman D. Basinger
Assistant Examiner—C. T. Bartz
Attorney, Agent, or Firm—Frank Frisenda, Jr.

[57] ABSTRACT

An amphibious pedal powered sailboat apparatus is provided by the present invention. In one embodied form, the inventive boating apparatus comprises in combination a relatively lightweight boat hull having an upper deck portion, a bow portion, and a stern portion; a front pair of wheels mounted on the hull for steering and to provide mobility of the apparatus on land and a rear pair of wheels mounted on the hull to provide traction and mobility of the apparatus on land; a first pedalling stand fixedly mounted in the bow portion of the hull and a second pedalling stand fixedly mounted in the stern portion of the hull; the first and second pedalling stands each comprising a pair of foot pedals mounted for rotational movement about a horizontal axis transverse to the longitudinal axis of the hull; and drive mechanism for coordinating operation of the pair of foot pedals on the first and second pedalling stands. A unique transmission system is provided wherein rotational movement of the foot pedals by one or more occupants of the apparatus is transmitted to a gearing system and the drive mechanism which synchronously powers a screw propeller and powers the rear pair of wheels to provide amphibious operation of the apparatus. Accordingly, the unique pedal powered sailboat apparatus of the present invention is capable of cruising on water with pedal power of the occupants and capable of land transportation without the use of fossil fueled combustion entines or electricity.

3 Claims, 6 Drawing Figures

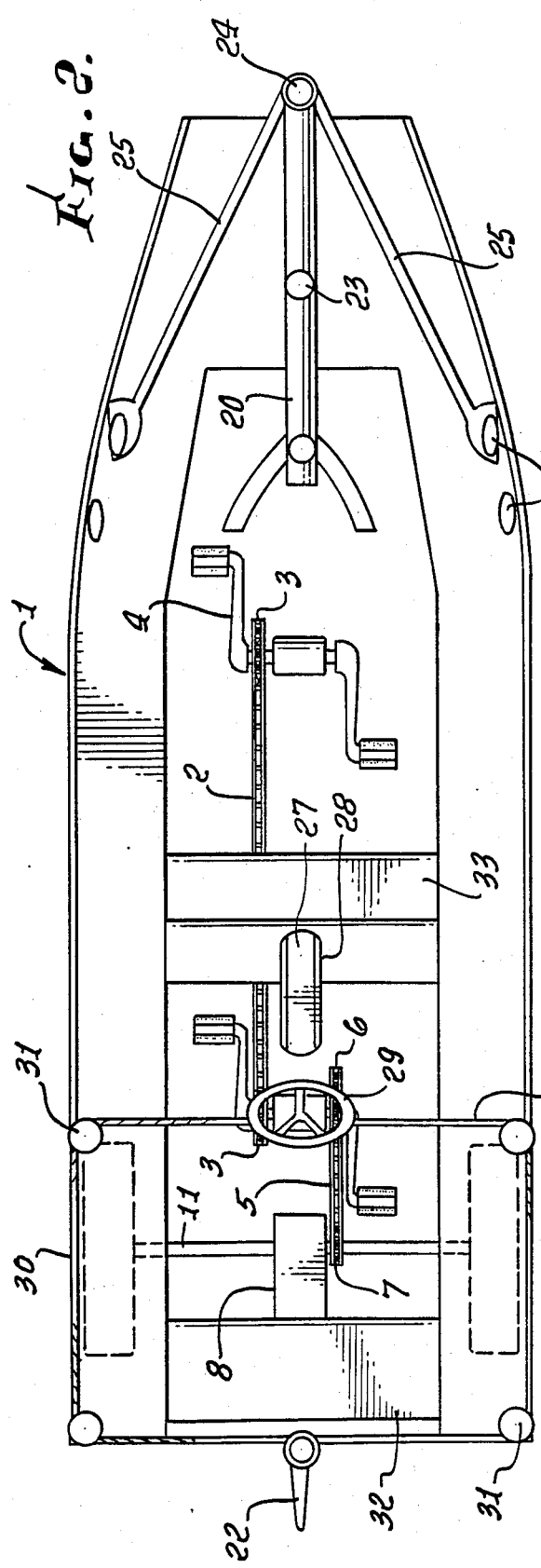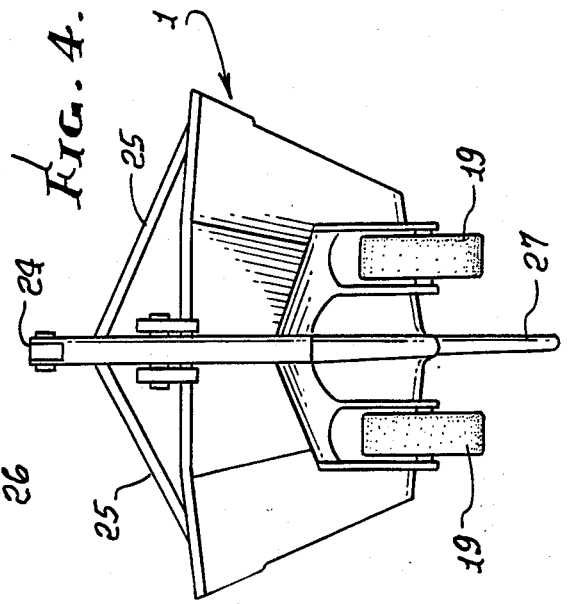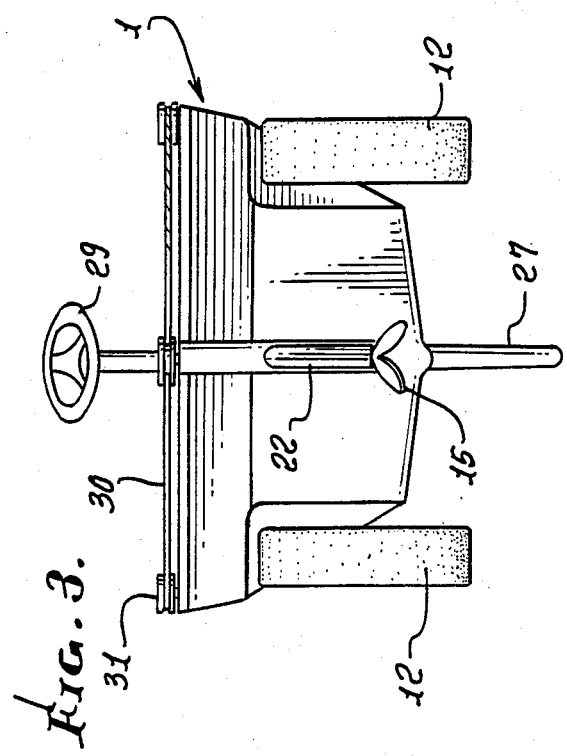

AMPHIBIOUS PEDAL POWERED SAILBOAT

CROSS-REFERENCE TO RELATED APPLICATION

This application is a continuation-in-part of my U.S. application Ser. No. 524,355, filed Aug. 18, 1983, for the invention entitled PEDAL POWERED SAILBOAT, which is now U.S. Pat. No. 4,533,330, issued Aug. 6, 1985.

BACKGROUND OF THE INVENTION

This invention relates to pedal powered boating apparatus, and more particularly, to an amphibious pedal powered sailboat apparatus which is capable of cruising on water and capable of land transportation without the use of fossil fueled combustion engines or electricity.

The growing importance of enjoyable exercise programs and concern on the part of the public to avoid pollution of the atmosphere has lead skilled artisans to develop a number of pedal powered vehicles. Moreover, pedal powered vehicles have continued to gain wide acceptance in developing countries such as Asia, and third world countries where a relatively low pro capita income does not permit the average consumer to own relatively costly automobile vehicles, as is typical in the United States.

One amphibious craft invented by Sessions and described in U.S. Pat. No. 2,930,340, is stated to be capable of being propelled on the water and/or land and which will be easily handled and comfortable to use and safe for the occupants. The Sessions craft comprises a hollow hull, a seat for the occupant mounted within the hull, a crank device mounted within the hull and bearings transversely of the hull, water propulsion means operatively connected to said crank device and disposed outside the hull, and at least three road wheels, at least one of which is adaptable for steering, and at least one of which as well as the water propulsion means is connected to the crank device.

Another boat like device is described in U.S. Pat. No. 3,031,692 by the inventor, Riek, and relates to a boat which can be used for multiple desired purposes. For instance, the Riek water craft which can be either propelled by means of an outboard engine or motor, or else can be propelled by means of a paddle wheel operated by foot actuated mechanism, can be utilized for fishing. In this context, it is stated that the user can propel the craft by foot actuated paddle wheel so as to selectively propel the craft with either motor or foot mechanism as desired.

Hollwarth, in U.S. Pat. No. 4,408,772, describes a sailing vehicle with a collapsible frame comprising two longitudinal supports, a plurality of identically constructed transverse struts detachably connected to the longitudinal supports, as least one sail mast, at least one seat, two rear moving elements, and one forward moving element, the latter being steerable via a steering suspension, and a cross arm which is detachably connected to the rear end of the longitudinal supports.

The instant inventor, Andrew Chun, has previously invented a pedal powered sailboat described and claimed in U.S. Application Ser. No. 524,355, filed Aug. 15, 1983, now U.S. Pat. No. 4,533,330, issued Aug. 6, 1985. In the parent Chun application, an amphibious pedal powered sailboat apparatus is disclosed comprising in combination a relatively lightweight boat hull having an upper deck portion, a bow portion, and a stern portion, the hull having peripheral air tanks mounted along the interior of the hull; a pair of wheels mounted on the hull for steering and to provide mobility of the apparatus on land and a rear pair of wheels mounted on the hull, to provide traction and mobility of the apparatus on land. The apparatus further comprises means for elevating the front pair of wheels mounted on the hull from ground level to deck level and drive means for coordinating operation of a pair of foot pedals mounted on first and second pedalling stands. The drive mechanism includes plural drive chains and plural sprocket wheels and gearing means for translating and apportioning the rotational movement of the foot pedals to a screw propeller mounted on the hull and to the pair of rear wheels mounted on the hull.

By the improvements disclosed herein, the instant inventor, Andrew Chun, has sought to simplify the earlier disclosed transmission system and minimize the likelihood of repairs relating to possible drive chain derailment after extensive wear and tear on the boating apparatus. Other improvements are also disclosed relating to manipulation of the rudder of the craft and improved construction of the boat hull to minimize water resistance as the boat is operated.

SUMMARY OF THE INVENTION

The present invention provides an improved pedal powered amphibious sailboat apparatus. In one embodied form, the inventive boating apparatus comprises a relatively lightweight hull, two pedalling stands which translate the rotational movement of the foot pedalling by one or two occupants to a gearing system.

The gearing system synchronously causes rotational movement of a screw propeller and a pair of wheels in the rear of the hull. Accordingly, the unique pedal powered sailboat apparatus of the present invention is capable of cruising water with pedal power of the occupants and capable of land transportation without the use of fossil fueled combustion engines or electricity.

The transmission system of the drive means has been improved to comprise plural units of bevel gears and a transmission shaft which links the end of a pinion shaft of pedalling gears with a miter gear shaft of a stern gear box for operation of the screw propeller disposed thereon.

This improvement from the transmission system disclosed in my co-pending application, Ser. No. 524,355, filed Aug. 18, 1983 which is hereby incorporated by this reference, minimizes the occurrence of mechanical problems with the chain transmission system. It has been discovered that mechanical problems of a chain transmission system may occur owing to chain derailment after the pedal powered boat has been extensively operated and used by the occupants.

Further, mitered gears together with a connection shaft, has been incorporated into my previously described inventive boating structure to replace the wiring link of plural pulley units for manipulation of a rudder of the boat apparatus. Hereto, it has been discovered that the extensive use of wiring linkage for manipulation of the boating rudder may result in an awkward shape of wiring stemming from lack of appropriate tension on the pulley manipulation system.

The central bottom portion of the improved boating apparatus herein described, eliminates a center board, and is constructed with a flat bottom in an oblong, oval shape, having a keel ridge of the boat. The configuration of a flat bottom boat with a shallow depression as deep as the keel bottom, with proper streamlining as herein disclosed, keeps water resistance to a minimum as the boat is operated.

The improved pedal powered amphibious boating apparatus preferably is equipped with a pair of front and rear wheels, the front pair for steering, and the rear pair for powering the device on land.

Drive means for the improved lightweight hull of the device includes a screw propeller, a gearing system, two pair of crank-pedals. The screw propeller is fixedly mounted at the end of a pinion shaft of a bevelled gear and is operated by pedal power.

The pinion shaft is supported by a marine bearing and is mounted with a screw propeller at its end. Accordingly, when pedalling force is transmitted to the drive means of the apparatus, a rotational movement of the screw propeller and rear wheels of the device is effected. The combination of the propeller and wheels enables the boating apparatus to be conveniently launched from lakeside or seaside, in that the occupants may drive the device from the beach directly into the water.

The inventive apparatus, thus provides an amphibious means of transportation completely powered by pedalling and optionally assisted by wind power (by the use of a sail) and avoids the dependence on environmental pollution sources, for instance, fossil fueled combustion engines. The occupants thereby enjoy a tranquil atmosphere with the benefit of enjoyable exercise.

Other features and advantages of the present invention will be further explained in the following detailed description in conjunction with the accompanying drawings.

BRIEF DESCRIPTION OF THE DRAWINGS

FIG. 2 is a top plan view of the improved boating apparatus as shown in FIG. 1;

FIG. 3 is a rear side elevational view of the boating apparatus as depicted in FIG. 2;

FIG. 4 is a front side elevational view of the boating apparatus as depicted in FIG. 2;

DESCRIPTION OF THE PREFERRED EMBODIMENT

This invention relates to a pedal powered amphibious boating apparatus which may be operated by one or two occupants. The pedalling system may be operated by one occupant in the bow portion of the boat and the other operator in the stern portion of the boat.

In more detail, the amphibious pedal powered boating apparatus comprises in combination:

a relatively lightweight boat hull having an upper deck portion, a bow portion, and a stern portion;

a front pair of wheels mounted on the hull for steering and to provide mobility of the boating apparatus on land and a rear pair of wheels mounted on the hull to provide traction and mobility of the apparatus on land;

a first pedalling stand fixedly mounted in the bow portion of the hull and a second pedalling stand fixedly mounted in the stern portion of the hull;

the first and second pedalling stands each comprise a pair of foot pedals mounted on the pedalling stand for rotational movement about a horizontal axis transverse to the longitudinal axis of the hull;

drive means are further included to coordinate operation of the pair of foot pedals on the pedalling stand;

the drive means includes plural units of bevel gears and a transmission shaft which links the end of a pinion shaft of the pedalling gears with a miter gear shaft of a stern gear box for operation of the screw propeller disposed thereon;

steering means for controlling directional movement of the boating apparatus;

wherein rotational movement of the foot pedals by one or more occupants of the boating structure is transmitted to the gearing system of the drive means which synchronously powers the screw propeller and powers the rear pair of wheels to provide amphibious operation of the apparatus.

In one embodied form, the unique boating apparatus further includes a sailing rig in the bow portion of the hull capable of converting or assisting the pedal powered operation with wind power.

Figure 1:
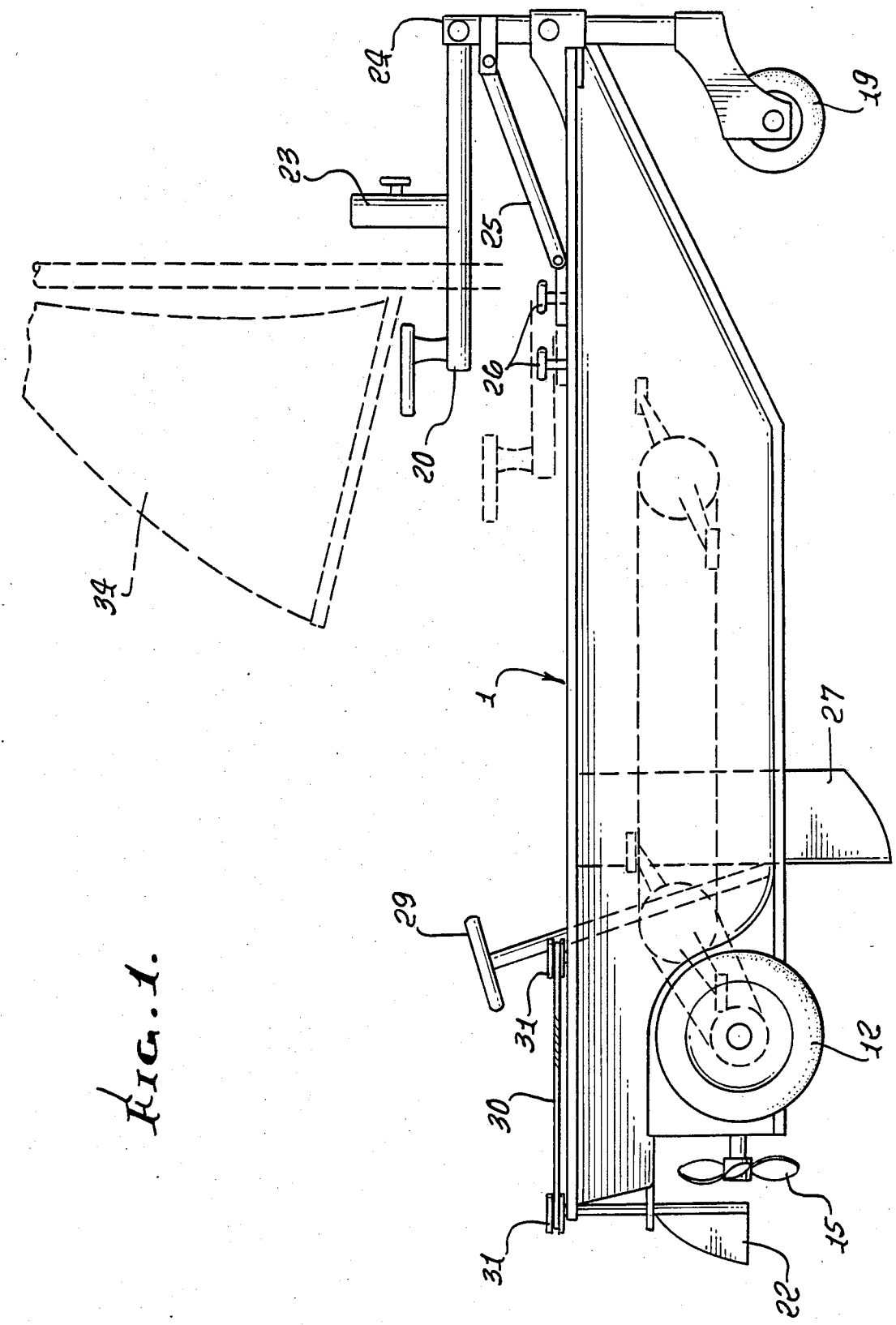
FIG. 1 is a side elevational view of a presently preferred embodied form of the invention showing a pedal powered boating apparatus in accordance with the present invention.

Referring now to the drawings, FIGS. 1 and 2 illustrate the general structure of a preferred embodied form of the inventive boating apparatus in accordance with the present invention.

In more detail, as seen in FIG. 1, the illustrated apparatus comprises a relatively lightweight hull upon which is mounted two pedalling stands.

As depicted in FIGS. 1 and 2, the pedalling stands comprises drive means, including a transmission shaft 5 and pedalling bevel gear 6 which is linked to stern bevel gear 7.

Figure 5:
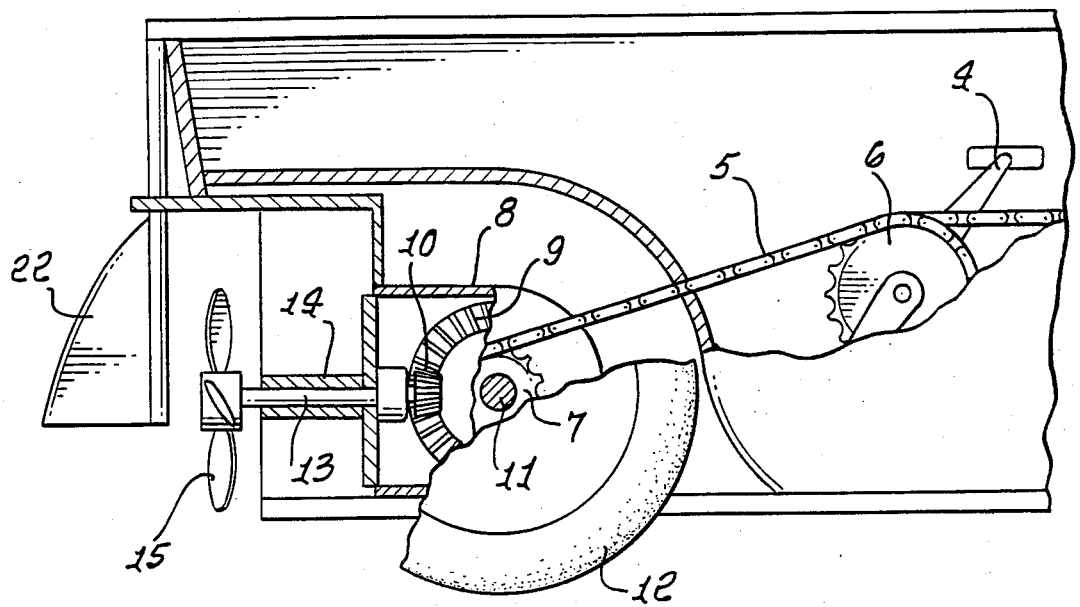
FIG. 5 is a fragmentary cross-sectional side view, in enlarged form, showing the stern section of the boating apparatus as depicted in FIG. 2.
Figure 6:
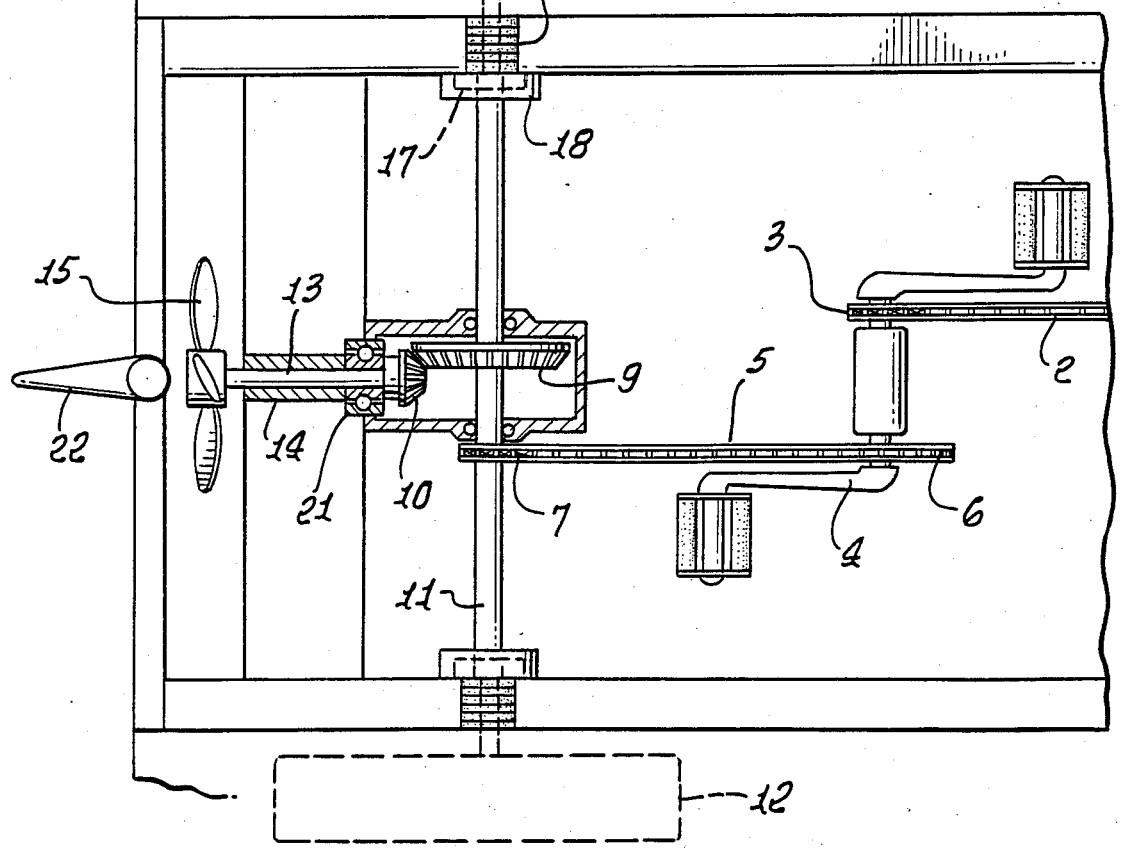
FIG. 6 is an enlarged cross-sectional top plan view of the stern section of the boating apparatus as depicted in FIG. 5.

The gear axle shaft 11 of the gear box 8 houses the bevel gears consisting of a spur gear 9 and a pinion 10. The respective ends of the arms of the spur gear axle shaft 11 are mounted with a pair of wheels 12, and the pinion shaft 13 passes through the marine bearing 14. A sealed bearing house 21 is extended outside the rear hull facing the rudder 22, and has a screw propeller 15 mounted at its end as shown in FIGS. 5 and 6. The spur gear axle shaft arms 11 are provided with rubber seal 16 and bushing 17, along with the threaded sealing cap 18.

The front wheels 19 are manipulated with an elongated handle 20 having four mast stand 23 thereon for setting sail 34 as shown in FIG. 1 with phantom lines.

As seen in FIG. 5, a transmission shaft 30 is utilized together with mitered gears 31 to manipulate the rudder 22 by the steering wheel 29.

As further seen in FIGS. 1 and 2, the hull portion of the boating apparatus comprises a depressed flat bottom 27, and a depressed boundary 28.

In operation on land, the steering of the device is carried out with the steering handle 20 which is bendable in right angle by flexible joint 24 and fastened by the support arms 25 to the anchor bolts 26.

Upon coming to a boating site, the boating apparatus is lowered on the beach with 4 wheels touching the ground. The occupant in the stern seat 32 is responsible for manipulating the steering wheel 29 to control the rudder 22, and the occupant in the bow seat 33 is responsible for the handling of steering mechanism 20. Those skilled in the art will readily appreciate various modifications can be made especially in view of my prior U.S. application, Ser. No. 524,355, filed Aug. 15, 1983, now U.S. Pat. No. 4,533,330, issued Aug. 6, 1985, which is hereby incorporated by this reference as though set forth fully herein.

Accordingly, the unique pedal powered boating apparatus of the present invention is capable of cruising water with pedal power of the occupants and capable of land transportation by the concurrent source of pedalling power without use of fossil fuel combustion engines or electricity.

I claim:

1. An amphibious pedal powdered sailboat apparatus comprising in combination:
    a relatively lightweight boat hull having an upper deck portion, a bow portion and a stern portion;
    a front pair of wheels mounted on said hull for steering and to provide mobility of said apparatus on land and a rear pair of wheels mounted on said hull, to provide traction and mobility of said apparatus on land;
    means for elevating said front pair of wheels mounted on said hull from ground level to deck level;
    a first pedalling stand fixedly mounted in the bow portion of said hull and a second pedalling stand fixedly mounted in the stern portion of said hull;
    said first and second pedalling stand each comprising a pair of foot pedals mounted on said pedalling stand for rotational movement about a horizontal axis transverse to the longitudinal axis of said hull;
    drive means for coordinated operation of said pair of foot pedals on said pedalling stands;
    said drive means including plural bevel gears and a transmission shaft connected to a pinion shaft for translating and apportioning the rotational movement of said foot pedals to a screw propeller mounted on said hull and to said pair of rear wheels mounted on said hull;
    a sail for optionally powering said apparatus by wind power; and
    steering means for controlling directional movement of said apparatus;
    wherein rotational movement of said foot pedals by one more occupants is transmitted to said gearing system of said drive means which synchronously powers said screw propeller and powers said rear pair of wheels to provide amphibious operation of said apparatus.

2. The amphibious powered sailboat apparatus as defined in claim 1 wherein said drive means comprises a screw propeller, a gear box containing a series of gears therein, two sets of drive chains, two pairs of crank-pedals and four sprocket wheels.

3. The amphibious pedal powered sailboat apparatus as defined in claim 2 wherein a first of said four sprocket wheels is positioned at said gear box, a second and third sprocket wheel is positioned at said second pedalling stand and a fourth sprocket wheel is positioned at said first pedalling stand,
    drive means for coordinated operation of the pair of foot pedals on the pedalling stands;
    the drive means including plural drive chains and plural sprocket wheels and gearing means for translating and apportioning the rotational movement of the foot pedals to a screw propeller mounted on the hull and to the pair of rear wheels mounted on the hull;
    a sail for optionally powering the apparatus by wind power; and
    steering means for controlling directional movement of the apparatus;
    wherein rotational movement of the foot pedals by one or more occupants is transmitted to the gearing system of the drive means which synchronously powers the screw propeller and powers the rear pair of wheels to provide amphibious operation of the apparatus.

* * * * *